United States Patent [19]
Tabata et al.

[11] Patent Number: 5,816,978
[45] Date of Patent: Oct. 6, 1998

[54] CONTROL SYSTEM FOR AUTOMATIC TRANSMISSION

[75] Inventors: Atsushi Tabata, Okazaki; Nobuaki Takahashi; Masato Kaigawa, both of Toyota, all of Japan

[73] Assignee: Toyota Jidosha Kabushiki Kaisha, Toyota, Japan

[21] Appl. No.: 749,399

[22] Filed: Nov. 15, 1996

[30] Foreign Application Priority Data

Nov. 22, 1995 [JP] Japan .................................. 7-327971

[51] Int. Cl.⁶ .................................................. F16H 61/12
[52] U.S. Cl. .......................................... 477/156; 477/906
[58] Field of Search .......................... 477/906, 97, 157, 477/159, 160, 161, 156; 701/67, 68, 54, 62

[56] References Cited

U.S. PATENT DOCUMENTS

| | | | |
|---|---|---|---|
| 4,838,124 | 6/1989 | Hamano et al. | 477/906 X |
| 4,889,014 | 12/1989 | Iwata | 477/101 |
| 4,967,620 | 11/1990 | Shimanaka | 477/906 X |
| 5,033,328 | 7/1991 | Shimanaka | 477/906 X |
| 5,052,246 | 10/1991 | Yamaguchi | 477/906 X |
| 5,060,540 | 10/1991 | Yamaguchi | 477/906 X |
| 5,667,457 | 9/1997 | Kuriyama et al. | 477/159 X |

FOREIGN PATENT DOCUMENTS 5 77660   3/1993  Japan .
5 164233  6/1993  Japan .

OTHER PUBLICATIONS

Toyota Motor Corporation, Toyota Technical Publication, No. 2560, Feb. 26, 1963, pp. 110–111.

*Primary Examiner*—Rodney H. Bonck
*Assistant Examiner*—William C. Joyce
*Attorney, Agent, or Firm*—Oblon, Spivak, McClelland, Maier & Neustadt, P.C.

[57] ABSTRACT

An automatic transmission control system for controlling oil pressure of a frictional engagement device in accordance with an input torque to an automatic transmission, comprising: a plurality of input torque estimating devices for estimating the input torque to the automatic transmission; a first oil pressure determining device for determining the oil pressure on the basis of the input torque to the automatic transmission, as estimated by any of the input torque estimating device; a trouble deciding device for deciding a trouble about the input torque value estimated by any input torque estimating device; and a second oil pressure determining device for determining the oil pressure on the basis of the input torque to the automatic transmission, as estimated by another input torque estimating device, if the trouble deciding device decides a trouble about the input torque value estimated by any input torque estimating device.

26 Claims, 6 Drawing Sheets

FIG. 2

| POSITION | | SOLENOID | | | | | | CLUTCH | | | BRAKE | | | | |
|---|---|---|---|---|---|---|---|---|---|---|---|---|---|---|---|
| | | NO.1 | NO.2 | NO.3 | NO.4 | SLU | SLN | C-1 | C-2 | C-0 | B-1 | B-2 | B-3 | B-4 | B-0 |
| P | | O | X | X | X | X | X | X | X | X | X | X | X | O | X |
| R | (V<20) | X | X | X | O | X | X | X | O | X | X | X | X | O | O |
| R | (V≧20) | O | O | X | O | X | X | X | O | X | X | X | X | O | O |
| N | | O | X | O | X | X | X | X | X | O | X | X | X | X | X |
| 1ST | ORDINARY | O | X | O | O | X | X | O | X | O | X | X | X | O | X |
| | E/G BRAKE | O | X | O | X | X | X | O | X | O | X | X | O | O | X |
| 2ND | ORDINARY | O | O | O | O | X | O | O | X | O | X | X | X | X | X |
| | E/G BRAKE | O | O | O | X | X | X | O | X | O | X | X | O | X | X |
| 3RD | ORDINARY | X | O | O | X | ◎ | X | O | X | O | X | O | X | X | X |
| | E/G BRAKE | X | O | O | O | ◎ | O | O | X | O | X | O | X | X | X |
| 4TH | | X | X | O | X | ◎ | X | O | X | X | O | O | X | X | X |
| 5TH | | X | X | X | O | ◎ | X | O | O | X | X | O | X | X | O |
| REMARKS | | ON<br>OFF | | ON : L-UP ON<br>OFF : L-UP OFF | | | | APPLY<br>RELEASE | | | | | | | |

O : ON / X : OFF
◎ : ON — APPLY

CONTROL SYSTEM FOR AUTOMATIC TRANSMISSION

BACKGROUND OF THE INVENTION

1. Field of the Invention

The present invention relates to a system for controlling an automatic transmission of a vehicle and, more particularly, to a system for controlling the oil pressure to be applied to a frictional engagement element, in accordance with an input torque to the automatic transmission.

2. Related Art

As is well known in the art, an automatic transmission for a vehicle is constructed to establish a predetermined gear stage by applying frictional engagement devices such as clutches or brakes with an oil pressure. What is required for this application pressure is a pressure capable of enduring a torque to be applied to the frictional engagement device. If this pressure is exceeded, the application pressure will drive a hydraulic pump more than necessary to lose the power. In the ordinary automatic transmission, therefore, the oil pressure is controlled to an application pressure according to the torque to be inputted, and this control applies to a shift transition time.

As a system for controlling the application pressure of the frictional engagement device on the basis of the input torque, there is disclosed in Japanese Patent Laid-Open No. 164233/1993 a system which is constructed to estimate the engine torque on the basis of the intake air flow of an engine and to determine an input torque from the speed ratio of a torque converter so that the input torque is determined by employing their difference as a correction data thereby to control the application pressure at the clutch-to-clutch shifting time.

It is difficult or practically impossible to detect the output torque of the engine directly. In the general prior art, therefore, the engine torque is estimated in terms of the throttle opening or the aforementioned intake air flow. The engine torque can be accurately estimated if based especially upon the intake air flow. If, however, the air flow meter for detecting the intake air flow or a device associated with the former is troubled, that is, is not operating correctly, there may arise a deviation between the application pressure of the frictional engagement device of the automatic transmission, as based upon the detected value of the intake air flow, and the actual torque. Especially if the engine air flow meter or its associated device fails, the engine can continue its operation. If, therefore, the application pressure of the frictional engagement device is determined on the basis of an output signal coming from the troubled air flow meter, there may arise the reduction in the durability of the frictional engagement device or the shift shock.

SUMMARY OF THE INVENTION

A main object of the present invention is to prevent the application pressure of the frictional engagement device from growing improper for the input torque.

Another object of the present invention is to control the application pressure of the frictional engagement device being shifted to a level proper for the input torque.

Still another object of the present invention is to control the oil pressure of the case, in which the input torque cannot be accurately estimated, to a value as proper for the actual input torque as possible.

An automatic transmission control system, to which is directed the present invention, controls the oil pressure of the frictional engagement device in accordance with the input torque to the automatic transmission. According to the present invention, therefore, there is provided an automatic transmission control system which comprises: a plurality of input torque estimating means for estimating the input torque to the automatic transmission; first oil pressure determining means for determining the oil pressure on the basis of the input torque to the automatic transmission, as estimated by any of the input torque estimating means; trouble deciding means for deciding a trouble about the input torque value estimated by the any input torque estimating means; and second oil pressure determining means for determining the oil pressure on the basis of the input torque to the automatic transmission, as estimated by another input torque estimating means, if the trouble deciding means decides a trouble about the input torque value estimated by the any input torque estimating means.

According to the automatic transmission control system of the present invention, therefore, when the input torque estimating means in normal service is troubled so that the input torque to the automatic transmission is estimated by another input torque estimating means, the oil pressure is determined by the second oil pressure determining means on the basis of the input torque estimated by the new input torque estimating means. As a result, even if the control characteristics of the input torque itself or the oil pressure for the input torque are changed with the change in the input torque estimating means, the second oil pressure determining means determines the oil pressure matching the actual input torque. Thus, it is effectively possible to prevent the torque to be applied to the frictional engagement device from growing relatively excessive and the frictional engagement device from accordingly slipping thereby to lower the durability of the frictional engagement device.

In the present invention, on the other hand, the input torque to the automatic transmission can be estimated on the basis of the detected value of the output torque of the engine. Moreover, the input torque of the automatic transmission can be estimated on the basis of not the detected value of the engine output torque itself but a value representing the engine output torque.

According to the present invention, on the other hand, there is provided a control system for an automatic transmission, as connected to an engine, for controlling the torque of the engine on the basis of a first control signal based on first torque estimating means and for controlling, if the first control signal is abnormal, the engine torque on the basis of a second control signal based on second torque estimating means, which system comprises: hydraulic control means for controlling the oil pressure of a frictional engagement device of the automatic transmission on the basis of the first control signal and for controlling, if the torque of the engine is controlled on the basis of the second control signal, the oil pressure to a level corresponding to a torque no less than the input torque of the automatic transmission, as determined on the basis of the first control signal.

In the present invention, therefore, when the signal for controlling the torque of the engine is switched from the first control signal to the second control signal, the oil pressure of the frictional engagement device is controlled by the hydraulic control means to the level which matches the torque no more than the torque of the engine based upon the first control signal. As a result, the application pressure of the frictional engagement device does not become lower so that the durability of the frictional engagement device can be improved while preventing the slip.

According to the present invention, moreover, there is provided a control system for an automatic transmission connected to an engine for driving an accessory and for controlling the oil pressure of a frictional engagement device in accordance with an input torque to the automatic transmission, which system comprises: trouble deciding means for deciding a trouble about the detected value of a load torque to be generated by the accessory; first input torque estimating means for estimating, if the trouble deciding means does not decide the trouble about the detected value of the load torque, the input torque on the basis of a torque control signal of the engine; and second torque input estimating means for estimating, if the trouble deciding means decides the trouble about the detected value of the load torque, the input torque to a level higher than the input torque estimated by the first input torque estimating means.

According to the present invention, therefore, while that torque of the output torque of the engine, which is employed for driving the accessory, is being normally detected, the torque, which is subtracted by the torque for driving the accessory, provides a basis for calculating the torque to be inputted to the automatic transmission, so that the first oil pressure determining means determines the corresponding oil pressure. If, on the contrary, the detected value of the torque to be used for driving the accessory is abnormal, the second input torque estimating means estimates a torque higher than the value estimated by the first input torque estimating means, as the input torque so that the oil pressure of the frictional engagement device to be controlled thereon grows necessarily and sufficiently high for the input torque. As a result, it is possible to prevent the slip of the frictional engagement device and the resultant reduction in the durability in advance.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 2 is a clutch/brake application chart tabulating the applying operations of frictional engagement devices for setting the individual gear stages by the automatic transmission shown in FIG. 1;

DETAILED DESCRIPTION OF THE PREFERRED EMBODIMENT

The present invention will be described in more detail with reference to the accompanying drawings. The automatic transmission, to which is directed the present invention, is constructed to control the application pressure of a frictional engagement device in accordance with an input torque, and an engine, to which is connected with the automatic transmission, is constructed to drive the automatic transmission continuously under a predetermined control condition, if it is in its drivable state although its intake system has failed. First of all, therefore, one example of the gear train of the automatic transmission will be described with reference to FIG. 1.

Figure 1:
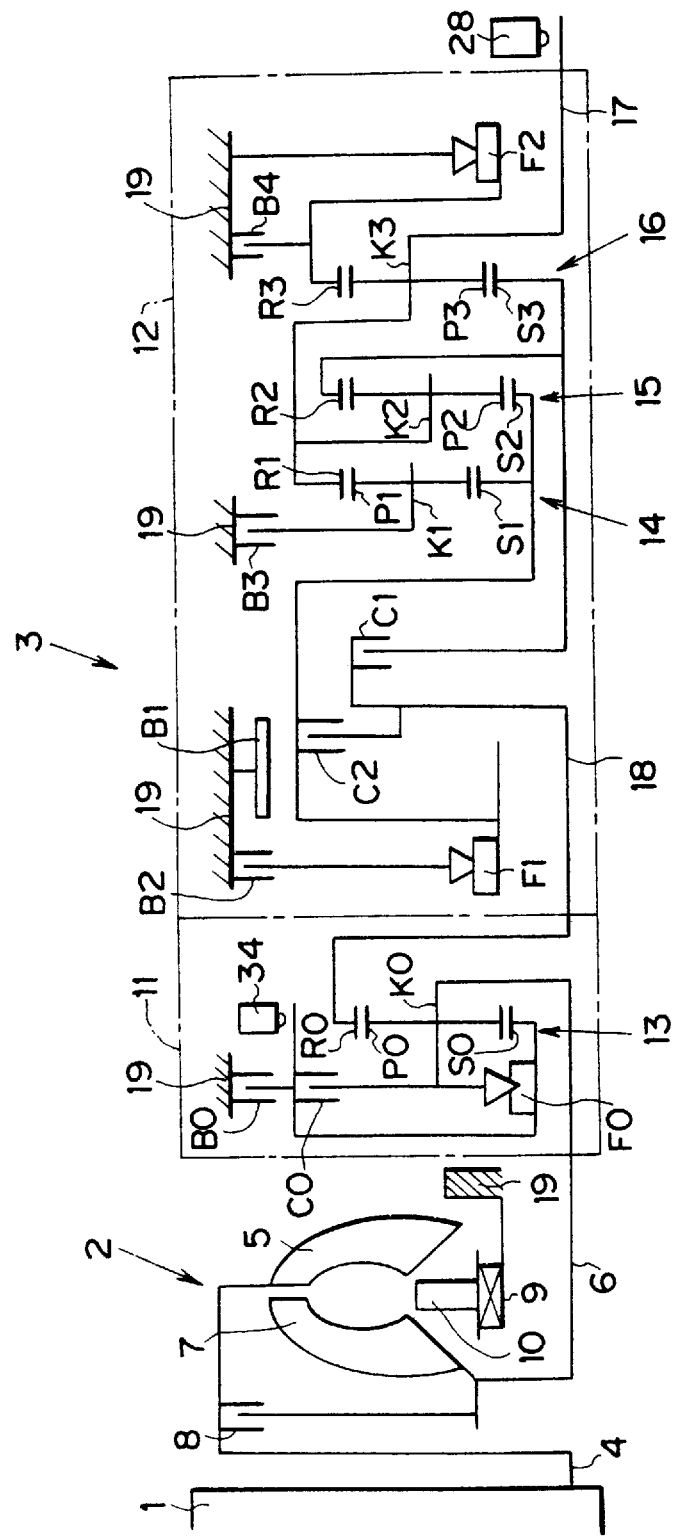
FIG. 1 is a skeleton diagram showing one example of a gear train of an automatic transmission, to which is directed the present invention.

To an engine 1, as shown in FIG. 1, there is connected an automatic transmission 3 through a torque converter 2. This torque converter 2 is equipped with: a pump impeller 5 connected to a crankshaft 4 of the engine 1; a turbine runner 7 connected to an input shaft 6 of the automatic transmission 3; a lockup clutch 8 for connecting those pump impeller 5 and turbine runner 7 directly; and a stator 10 prevented from rotating in one direction by a one-way clutch 9.

The automatic transmission 3 is equipped with an auxiliary transmission 11 for interchanging two high and low gear stages, and a main transmission 12 for interchanging a reverse gear stage and four forward gear stages. The auxiliary transmission 11 is equipped with a planetary gear unit 13 composed of a sun gear S0, a ring gear R0 and a pinion P0 rotatably supported by a carrier K0 and meshing with the sun gear S0 and the ring gear R0; a clutch C0 and a one-way clutch F0 interposed between the sun gear S0 and the carrier K0; and a brake B0 interposed between the sun gear S0 and a housing 19.

The main transmission 12 is equipped with: a first planetary gear unit 14 composed of a sun gear S1, a ring gear R1, and a pinion P1 rotatably supported by a carrier K1 and meshing with those sun gear S1 and ring gear R1; a second planetary gear unit 15 composed of a sun gear S2, a ring gear R2, and a pinion P2 rotatably supported by a carrier K2 and meshing with those sun gear S2 and ring gear R2; and a third planetary gear unit 16 composed of a sun gear S3, a ring gear R3, and a pinion P3 rotatably supported by a carrier K3 and meshing with those sun gear S3 and ring gear R3.

The two sun gears S1 and S2 are connected to each other, and the ring gear R1 and the carriers K2 and K3 are connected to each other. The latter carrier K3 is connected to an output shaft 17. On the other hand, the ring gear R2 is connected to the sun gear S3. Moreover, a first clutch C1 is interposed between the ring gear R2 and the sun gear S3, and a second clutch C2 is interposed between the sun gears S1 and S2 and the intermediate shaft 18.

As the brake means, on the other hand, there is mounted in the housing 19 a first brake B1 of band type for stopping the rotations of the sun gear S1 and the sun gear S2. Between the sun gears S1 and S2 and the housing 19, there are mounted in series the first one-way clutch F1 and a brake B2. This first one-way clutch F1 is constructed to be applied when the sun gears S1 and S2 are to rotate in the direction opposite to the input shaft 6.

A third brake B3 is interposed between the carrier K1 and the housing 19, and a fourth brake B4 and the second one-way clutch F2 are interposed in parallel between the ring gear R3 and the housing 19. This second one-way clutch F2 is constructed to be applied when the ring gear R3 is to rotate backward. The clutches C0, C1 and C2 and the brakes B0, B1, B2, B3 and B4 thus far recited are the hydraulic type frictional engagement devices, the friction elements of which are applied when actuated by the oil pressure.

The automatic transmission thus far described can set five forward and one reverse gear stages, and the applied/ released states of the individual frictional engagement devices for those gear stages are tabulated in the clutch/brake application diagram of FIG. 2. In FIG. 2, symbols ○ indicate the applied states, and symbols×indicate the released states.

Figure 3:
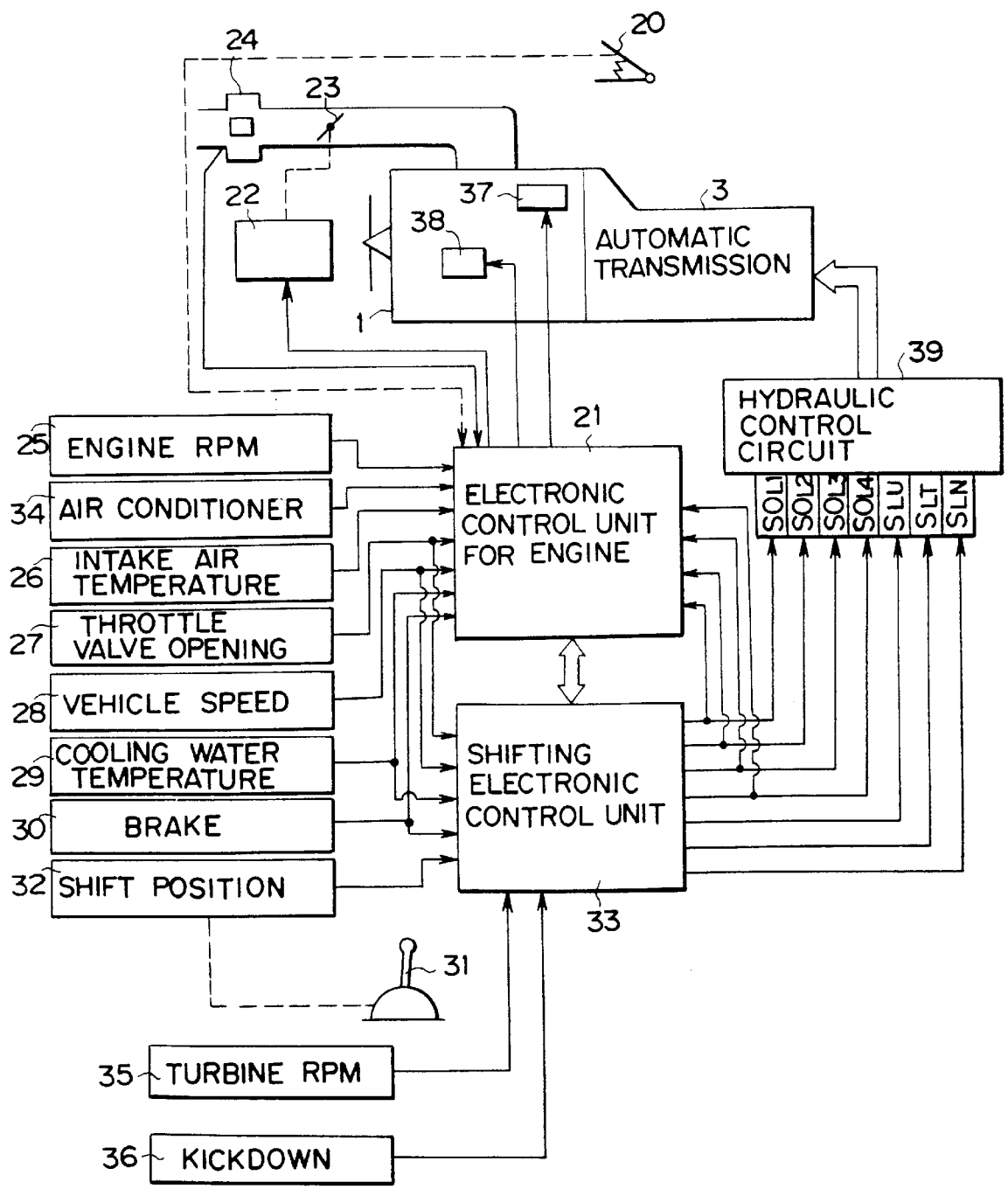
FIG. 3 is a control system diagram illustrating an engine and the automatic transmission, as shown in FIG. 1.

FIG. 3 is a control system diagram showing the engine 1 and the automatic transmission 3. A signal according to the depression of an accelerator pedal 20 is inputted to an electronic control unit 21 for the engine 1. On the other hand, the intake pipe of the engine 1 is equipped with an electronic throttle valve 23 to be driven by a throttle actuator 22, and an air flow meter 24 arranged upstream of the former, i.e., at the intake port side for detecting an intake air flow. Moreover, a control signal is outputted according to the depression of the accelerator pedal 20 from the electronic control unit 21 to the throttle actuator 22 so that the degree of opening of the electronic throttle valve 23 is controlled by the degree of control. On the other hand, the air flow meter 24 inputs its detection signal or an intake air flow Q to the electronic control unit 21.

There are further provided: an engine RPM sensor 25 for detecting the RPM of the engine 1; an intake air temperature sensor 26 for detecting the temperature of the intake air; a throttle sensor 27 for detecting the degree of opening θ of the electronic throttle valve 23; a vehicle speed sensor 28 for detecting a vehicle speed V in terms the RPM of the output shaft 17; a cooling water temperature sensor 29 for detecting the cooling water temperature of the engine 1; a brake switch 30 for detecting the operation of the brake; and a shift position sensor 32 for detecting the shift position of a shift lever 31. From these sensors, there are fed to the engine electronic control unit 21 and a shifting electronic control unit 33 the signals indicating the engine RPM Ne, the intake air temperature Tha, the opening θ of the electronic throttle valve 23, the vehicle speed V, the engine cooling water temperature THw, the brake operating state BK, and the shift position Psh of the shift lever 31. Moreover, a signal for activating/inactivating an accessory such as an air conditioning unit (as will be shortly called the "air-con") 34 is inputted to the engine electronic control unit 21.

Still moreover, a signal indicating a turbine RPM NT is inputted from a turbine RPM sensor 35 for detecting the RPM of the turbine runner 7 to the shifting electronic control unit 33. In addition, a signal indicating the kickdown operation is fed from a kickdown switch 36 for detecting that the accelerator pedal 20 is operated to its maximum operation position to the shifting electronic control unit 33.

The engine electronic control unit 21 is the so-called "micro-computer" which is equipped with a central processing unit (CPU), a storage unit (including an RAM and a ROM) and an input/output interface. The CPU processes the input signals to execute a variety of engine controls in accordance with the programs stored in advance in the ROM while utilizing the temporary storage function of the RAM. For example, the engine electronic control unit 21 controls a fuel injection valve 37 for controlling a fuel injection rate, an igniter 38 for controlling the ignition timing, and the not-shown bypass valve for controlling the idle speed, and executes all the throttle controls including a traction control by controlling the electronic throttle valve 23 with the throttle actuator 22. In case of failure of the air flow meter 24, the intake air temperature sensor 26 or their associated circuit, the signal for controlling the drive state of the engine 1 such as the fundamental fuel injection time or the ignition timing is fixed at a predetermined level so that the engine 1 may be driven under a predetermined drive condition.

The shifting electronic control unit 33 is also a microcomputer similar to that of the engine electronic control unit 21, and its CPU utilizes the temporary storage function of a RAM to process the input signals in accordance with the programs stored in advance in a ROM and to drive the individual solenoid valves or linear solenoid valves of a hydraulic control circuit 39. For example, the shifting electronic control unit 33 controls a linear solenoid valve SLT for producing an output pressure PSLT having a level corresponding to the opening of the throttle valve 23. Further controlled is a linear solenoid valve SLN for controlling the accumulator back pressure. Further controlled is a linear solenoid valve SLU for controlling the slip of the lockup clutch 8 and for controlling the application pressure of a predetermined one of the clutches and brakes at a transient time of the shift in accordance with the progress of the shift and the input torque.

In addition, the shifting electronic control unit 33 determines the gear stage of the automatic transmission 3 and the application state of the lockup clutch 8 on the basis of the shift diagram which uses the fundamental throttle valve opening θ (i.e., the throttle opening, as converted by predetermined non-linear characteristics against the depression of the accelerator pedal) and the vehicle speed V as its parameters. The shifting electronic control unit 33 drives first to third solenoid valves SOL1, SOL2 and SOL3 to achieve the gear stage and the application state thus determined, and drives a fourth solenoid valve SOL4 to establish an engine braking effect.

On the other hand, the lockup clutch 8 is released at the first and second speeds of the automatic transmission 3. At the third and fourth speeds, however, any region for releasing, slipping or applying the lockup clutch 8 is decided on the basis of the fundamental throttle valve opening θ and the vehicle speed V so that the lockup clutch 8 is slipped for the slip region or applied for the application region. This slip control is provided for suppressing the rotational loss of the torque converter 2 as much as possible while absorbing the rotational fluctuation of the engine 1.

Figure 4:
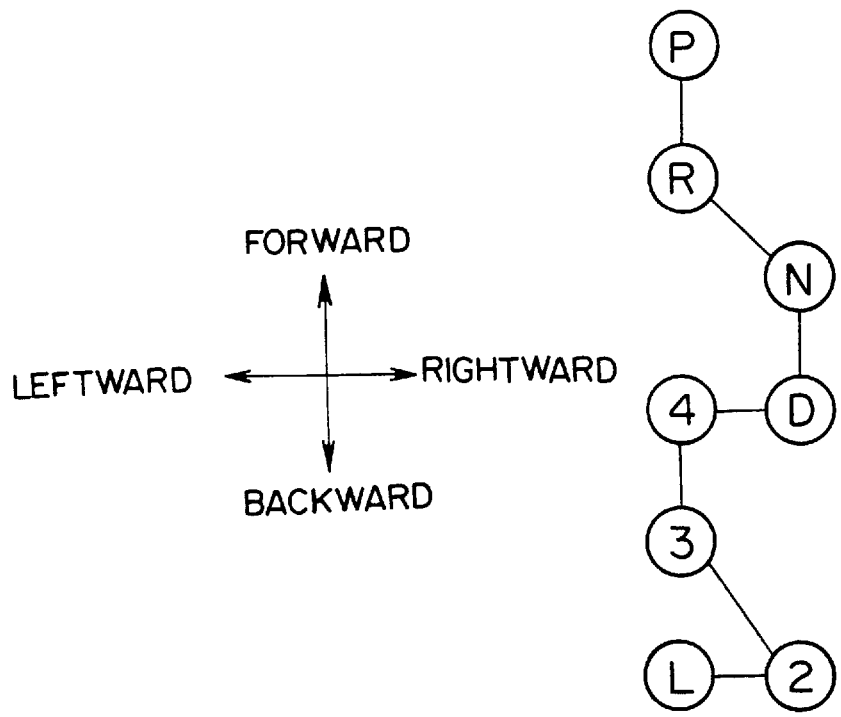
FIG. 4 is a diagram illustrating an array of the individual range positions in a shift device shown in FIG. 3.

FIG. 4 illustrates the shift positions of the shift lever 31. As shown, this shift lever 31 is so supported by the not-shown support unit as can be operated into eight shift positions by combining the six shift positions, as taken in the longitudinal directions of the vehicle, and two shift positions, as taken in the transverse directions of the vehicle. Specifically: letter P designates a parking range position; letter R a reverse range position; letter N a neutral range position; letter D a drive range position; numeral "4" a "fourth" range position covering the gear stages to the fourth speed; numeral "3" a "third" range position covering the gear stages to the third speed; numeral "2" a "second" range position covering the gear stages to the second speed; and letter L a low range position for inhibiting the upshift to the gear stages over the first speed.

Figure 5:
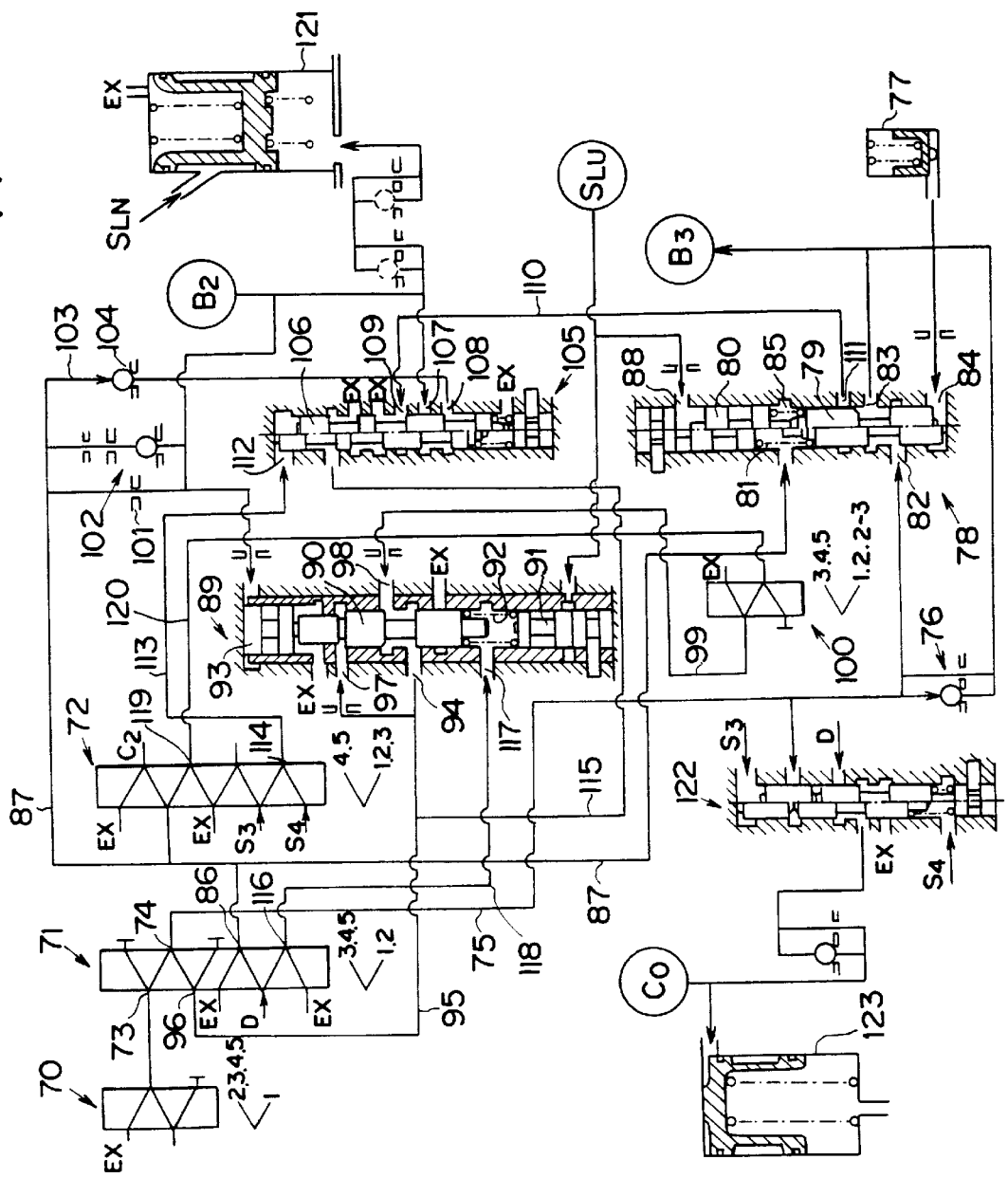
FIG. 5 is a hydraulic circuit diagram illustrating that portion of a hydraulic control circuit shown in FIG. 3, which is used to control a second brake and a third brake mainly.

In the automatic transmission 3 shown in FIG. 2, the speed change between the second speed and the third speed is the clutch-to-clutch shift for changing the application states of both the third brake B3 and the second brake B2. In order to execute this speed change smoothly and quickly, a circuit, as shown in FIG. 5, is assembled in the aforementioned hydraulic control circuit 38. The circuit of FIG. 5 is constructed to control the application pressure PB3 of the third brake B3 directly in an electric manner, as will be simply described in the following.

In FIG. 5: reference numeral 70 designates a 1–2 shift valve; numeral 71 designates a 2–3 shift valve; and numeral 72 designates a 3–4 shift valve. These shift valves 70, 71 and 72 have their individual ports opened to have communications at the individual gear stages, as respectively enumerated below themselves. Incidentally, the numerals indicate the individual gear stages. Of the ports of the 2–3 shift valve 71, a brake port 74 to communicate with an input port 73 at the first and second speeds is connected to the third brake B3 via an oil passage 75. This oil passage 75 is equipped with an orifice 76, and a damper valve 77 is connected between the orifice 76 and the third brake B3. The damper valve 77 sucks the oil pressure a little to perform its damping action in case the third brake B3 is abruptly fed with the line pressure.

Reference numeral 78 designates a B-3 control valve for controlling the application pressure of the third brake B3 directly. Specifically, the B-3 control valve 78 is equipped with a spool 79, a plunger 80 and a spring 81 sandwiched between the former two. An input port 82 to be connected by the spool 79 is connected to the oil passage 75, and an output port 83 to be selectively caused to communicate with the input port 82 is connected to the third brake B3. The output port 83 is further connected to a feedback port 84 which is formed at the inside of the leading end of the spool 79. On the other hand, a port 85 opened into a portion, in which the aforementioned spring 81 is arranged, is made to communicate with such one 86 of the ports of the 2–3 shift valve 71 via an oil passage 87 as outputs a D-range pressure at a third or higher speed gear stage. Moreover, a control port 88 formed at the side of the end portion of the plunger 80 is connected to the lockup clutch linear solenoid valve SLU.

As a result, the B-3 control valve 78 has its regulated pressure level set by the elastic force of the spring 81 and the oil pressure fed to the port 85. In this case, the higher the signal pressure is fed to the control port 88, the larger the elastic force of the spring 81 becomes.

In addition, reference numeral 89 appearing in FIG. 5 designates a 2–3 timing valve which is constructed to include: a spool 90 formed with one radially smaller land and two radially larger lands; a first plunger 91; a spring 92 sandwiched between the former two; and a second plunger 93 arranged at the side opposed to the first plunger 91 across the spool 90. This 2–3 timing valve 89 has its intermediate port 94 connected to an oil passage 95, which in turn is connected to such a port 96 of the 2–3 shift valve 71 as is caused to communicate with such the brake port 74 at a third or higher speed gear stage.

Moreover, the oil passage 95 is branched in its midway and connected through an orifice to a port 97 which is opened between the aforementioned smaller-diameter land and one of the larger-diameter lands. A port 98 to be selectively caused to communicate with the port 94 at the intermediate portion is connected via an oil passage 99 to a solenoid relay valve 100. Moreover, the lockup clutch linear solenoid valve SLU is connected to the port which is opened in the end portion of the first plunger 91, and the second brake B2 is connected through an orifice to the port which is opened in the end portion of the second plunger 93.

The aforementioned oil passage 87 is provided for applying/releasing the oil pressure to and from the second brake B2 and is equipped in its midway with a smaller-diameter orifice 101 and an orifice 102 having a check ball. From this oil passage 87, there is branched an oil passage 103 which is equipped with a larger-diameter orifice 104 having a check ball to be opened when the second brake B2 is to be released. The oil passage 103 is connected to an orifice control valve 105, as will be described in the following.

This orifice control valve 105 controls the rate of releasing the pressure from the second brake B2. This second brake B2 is connected to a port 107 which is so formed in an intermediate portion as can be opened or closed by a spool 106 of the orifice control valve 105. The aforementioned oil passage 103 is connected to a port 108 which is formed below that port 107, as shown. A port 109 is formed above the port 107 connected to the second brake B2, as shown, and is selectively caused to communicate with a drain port. To that port 109, there is connected via an oil passage 110 a port 111 of the aforementioned B-3 control valve 78. Incidentally, this port 111 is selectively caused to communicate to the output port 83 which is connected to the third brake B3.

Of the ports of the orifice control valve 105, a control port 112 formed at the end portion opposed to the spring for urging the spool 106 is connected to a port 114 of the 3–4 shift valve 72 via an oil passage 113. This port 114 outputs a signal pressure of the third solenoid valve S3 at a third or lower speed gear stage and a signal pressure of the fourth solenoid valve S4 at a fourth or higher speed gear ratio. To the orifice control valve 105, moreover, there is connected an oil passage 115 which is branched from the aforementioned oil passage 95 and which is selectively caused to communicate with the drain port.

Incidentally, in the aforementioned 2–3 shift valve 71, a port 116 for outputting a D-range pressure at a second or lower speed gear state is connected via an oil passage 118 to a port 117 which is opened in such a portion of the aforementioned 2–3 timing valve 89 as is arranged with the spring 92. In the 3–4 shift valve 72, moreover, a port 119, which is caused to communicate with the aforementioned oil passage 87 at a third or lower speed gear stage, is connected via an oil passage 120 to the solenoid relay valve 100.

In FIG. 5, reference numeral 121 designates an accumulator for the second brake B2. A back pressure chamber of the accumulator 121 is supplied with an accumulator control pressure which is regulated on the basis of the oil pressure outputted by the linear solenoid valve SLN. Incidentally, the accumulator control pressure becomes higher as the output pressure of the linear solenoid valve SLN is lowered. Accordingly, in a transition region between application and release of the second brake B2, the oil pressure thereof is changed to a higher level as the signal pressure of the linear solenoid valve SLN is lowered. By lowering the signal pressure of the linear solenoid valve SLU temporarily, on the other hand, the application pressure of the second brake B2 can be temporarily raised.

Moreover, reference numeral 122 designates a C-0 exhaust valve, and numeral 123 designates an accumulator for the clutch C0. Incidentally, the C-0 exhaust valve 122 applies the clutch C0 so as to effect the engine braking only at the second speed in the second speed range.

According to the hydraulic circuit thus far described, therefore, if the port 111 of the B-3 control valve 78 is in communication with the drain, the application pressure to be fed to the third brake B3 can be directly regulated by the B-3 control valve 78, and its regulated pressure level can be varied by the linear solenoid valve SLU. If, on the other hand, the spool 106 of the orifice control valve 105 is in the position, as shown at the lefthand side of FIG. 5, the second brake B2 has communication with the oil passage 103 through that orifice control valve 105. As a result, the pressure can be released through the larger-diameter orifice 104 to control the rate of releasing the pressure from the second brake B2.

The application pressure of each frictional engagement device in the aforementioned automatic transmission 3 takes the level which is determined by the line pressure to be controlled according to the throttle opening θ of the engine 1. For example, the application pressure PB3 of the third brake B3 at the shifting time, i.e., the clutch-to-clutch shift between the second speed and the third speed is controlled on the basis of the shifting situation or the input torque. In the upshift from the second speed to the third speed, for example, the application pressure PB3 of the third brake B3 is controlled together with the oil pressure PB2 of the second brake B2 in the so-called "overlapping manner" having a predetermined torque capacity to promote the reduction of the input RPM to the synchronous RPM of the third speed. At the downshift from the third speed to the second speed, on the contrary, the application pressure of the third brake B3 is kept under a low level in the so-called "underlapping manner" to promote the rise in the input RPM to the synchronous RPM of the second speed. At the end of the downshift to the second speed, on the other hand, the shock, as might otherwise be caused by the torsion torque, is prevented by raising the application pressure of the second brake B2 to be finally released, temporarily to lower the torque.

Thus, the application pressure may be controlled according to the shifting situation. The application pressure of this case has to be set to the level according to the input torque so as to prevent the reduction in the durability due to the slip of the frictional engagement element. The torque, as inputted to the automatic transmission 3, is influenced the most by the output torque of the engine 1, i.e., the drive state of the engine 1 so that the input torque is detected (or estimated) on the basis of the control signals controlling the engine 1. As described hereinbefore, however, the control signals for controlling the drive state of the engine 1 exist in plurality so that the input torque cannot be detected (or estimated) on the basis of a single control signal. In the present invention, therefore, the controls are made in the following manner.

Figure 6:
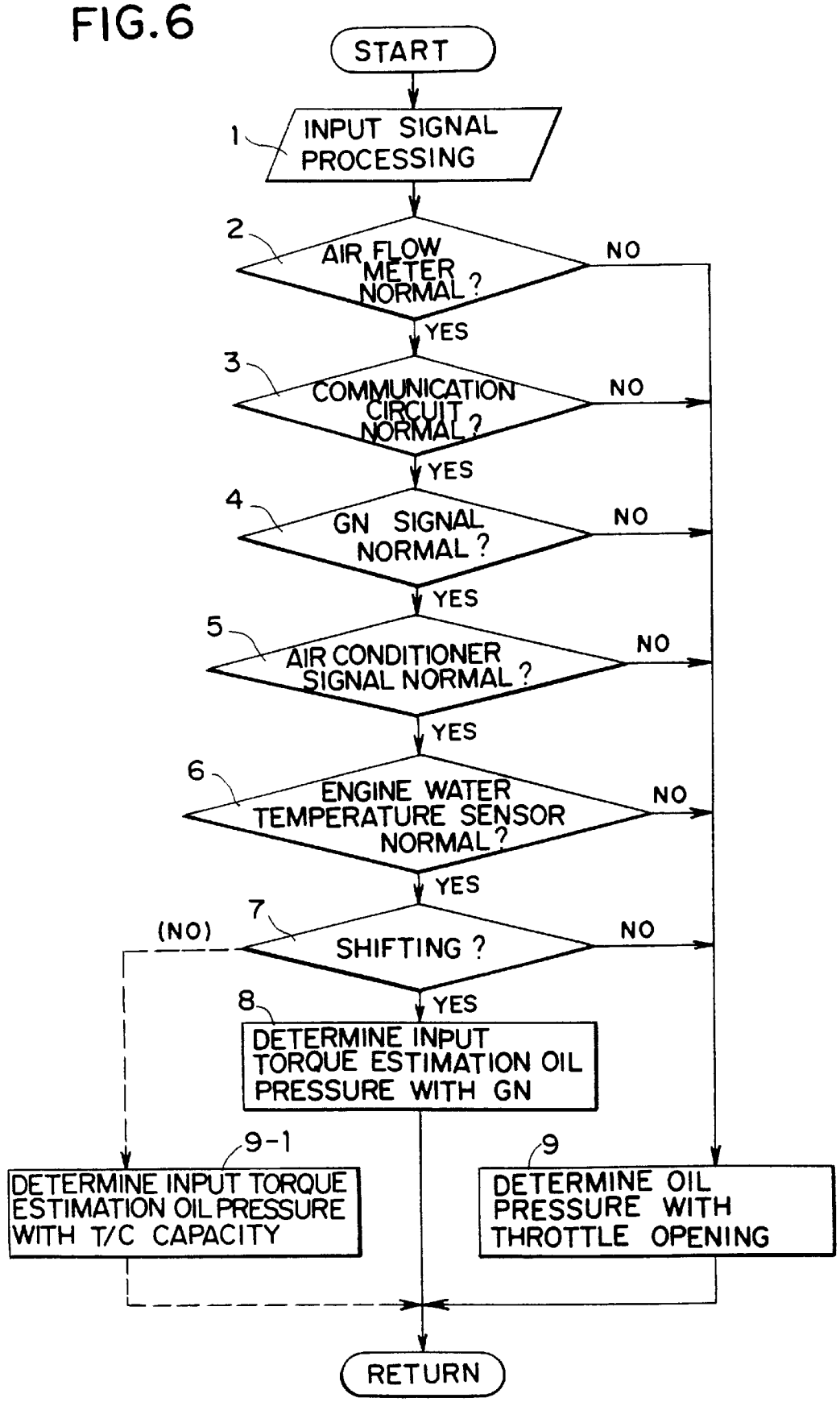
FIG. 6 is a flow chart for explaining controls to estimate input torques at an ordinary time and on a failure and to determine an oil pressure in the present invention.

FIG. 6 is a flow chart for explaining the content of the controls. After the input signal processing or reading (at Step 1), it is decided (at Step 2) whether or not the air flow meter 24 is normal. If the intake air flow cannot be accurately detected, the engine 1 is controlled by fixing the engine control conditions including the fuel injection timing or the ignition timing to predetermined ones.

It is then decided (at Step 3) whether or not the communication circuit between the engine electronic control unit 21 and the shifting electronic control unit 33 is normal. This decision is made to examine whether or not the condition for the shifting electronic control unit 33 to achieve the data for detecting the input torque is satisfied. It is then decided (at Step 4) whether or not the intake air flow signal GN is normal. Specifically, the trouble condition is decided if the absolute value of the change in the intake air flow is large, if the deviation from the change to be estimated from the throttle opening is large or if the time period for the detection signal to remain at a fixed value is long.

Incidentally, the decision on whether or not the intake air flow signal GN is normal is based upon the fact that the intake air flow is used as the data for estimating the input torque. If this input torque is decided on the basis of other data such as the intake pipe vacuum, the decision is made upon whether or not the data are normal.

It is then decided (at Step 5) whether or not the air-con signal is normal. In short, this step is provided for deciding the operating state of the accessory, because the output torque of the engine 1 is partially consumed for driving the accessory such as the air-con to reduce the input torque to be fed to the automatic transmission 3 so that the input torque is decided (or estimated) after the torque to be consumed in the accessory has been subtracted from the engine torque.

It is then decided (at Step 6) whether or not the cooling water temperature 29 is normal. This is because the friction torque correction is performed on the basis of the engine water temperature (or the cooling water temperature) so that the detection (or estimation) of the input torque is premised by the correct detection of the engine water temperature.

Any of the foregoing Steps 2 to 6 is provided for deciding whether or not the fundamental data for estimating the input torque of the automatic transmission 3 are normal. Hence, these Steps 2 to 6 correspond to the trouble deciding means of the present invention. If the answer of any of those Steps 2 to 6 is YES, the routine advances to Step 7 to decide whether or not the automatic transmission is shifting. If shifting, the input torque is estimated on the basis of the intake air flow signal GN, and the oil pressure (or the application pressure) is determined (at Step 8) on the basis of the estimated input torque. The application pressure of the frictional engagement device being changed has to be controlled accurately and quickly so as to prevent the shift shock and the excessive slip of the frictional engagement element. On the other hand, the torque of the engine 1 reflects the intake air flow relatively accurately. During the shifting operation, therefore, the input torque is estimated on the basis of the intake air flow signal GN. Incidentally, the intake pipe vacuum can be used in place of that intake air flow for estimating the input torque. Thus, this Step 8 corresponds to the input torque estimating means and the first oil pressure determining means in the present invention.

Incidentally, the oil pressure to be determined on the basis of the input torque is the back pressure of the accumulator, the pressure of the frictional engagement device, if directly controlled, or the pilot pressure of a pressure regulating value if in the clutch-to-clutch shift. Moreover, the target of the direct control is the aforementioned linear solenoid valve SLN or the linear solenoid valve SLU.

Here, the estimated value TE of the input torque can be calculated from the following formula:

$$TE = TE0 - TEI - \Delta TEE - \Delta TEC$$

Here, TE0 indicate an input torque value to be determined from the intake air flow, that is, from the map using the intake air flow and the engine RPM as the parameters. Moreover: TEI indicate a torque based upon the engine inertia; ΔTEE indicate an accessory loading torque; and ΔTEC indicate a cold loss torque. Still moreover, an oil pressure P is computed as a function of the estimated input torque value TE calculated from the aforementioned formula.

If the answer of any of the Steps 2 to 7 is NO, that is, if any of the air flow meter 24, the communication circuit, the intake air flow signal GN, the air-con signal or the engine water temperature sensor is abnormal, or if the automatic transmission is not shifting, on the contrary, the oil pressure is determined (at Step 9) on the basis of the throttle opening θ as in the ordinary automatic transmission. This is because the throttle opening θ reflects the engine torque although not so accurate as the intake air flow. At this Step 9, too, the input torque is estimated so that the application pressure is determined on the basis of that estimation result. This Step 9 corresponds to the input torque estimating means and the second oil pressure determining means in the present invention.

Incidentally, the aforementioned control of Step 9 may be replaced by the control, as indicated at Step 9–1 in FIG. 6.

In this control, the input torque is estimated, and the oil pressure is determined on the basis of the capacity of the torque converter 2 and the engine RPM. Specifically, the input torque is computed by the following formula from the engine RPM Ne and the capacity coefficient C of the torque converter 2:

$$TE = NE2 \times C.$$

Specifically, this Step 9–1 corresponds the input torque estimating means and the second oil pressure determining means in the present invention.

In the control system thus far described, therefore, the input torque is estimated on the basis of the intake air flow during the shifting operation having no failure so that an accurate estimation can be achieved. In addition, the application pressure of the frictional engagement device is determined on the basis of the estimated value so that the torque to be applied to the frictional engagement device accurately matches the application pressure. As a result, it is possible to prevent the slip of the frictional engagement element and the reduction in the durability of the same. Since the oil pressure does not grow excessive, on the contrary, it is possible to prevent the increase in the power loss and the deterioration of the shift shock.

If the failure of the air flow meter 24 or the trouble about the detection of the load of the accessory causes the engine 1 to be controlled under a predetermined condition or the input torque to the automatic transmission 3 to be inaccurately calculated, the input torque is estimated, and the oil pressure is preparatorily determined on the basis of the throttle opening θ or the capacity of the torque converter 2. As a result, the oil pressure to be determined on the basis of the input torque is not highly deviated from the input torque so that it is set to a level no less than that required for at least the input torque. Thus, it is possible to prevent the slip of the frictional engagement device and the resultant reduction in the durability as in the case of no failure.

Although the present invention has been described in connection with its specific embodiment, it should not be limited thereto, but the automatic transmission, to which is directed the present invention, may be one having a gear train or a hydraulic circuit other than that shown in FIG. 1 or FIG. 4. As has been described in connection with the foregoing embodiment, moreover, a variety of data can be adopted, if necessary, by the individual input torque estimating means in the present invention.

What is claimed is:

1. An automatic transmission control system for determining oil pressure of a frictional engagement device in accordance with an input torque to an automatic transmission, comprising:
   a plurality of input torque estimating means for estimating the input torque to said automatic transmission;
   first oil pressure determining means for determining said oil pressure on the basis of the input torque to said automatic transmission, as estimated by any one of said input torque estimating means;
   trouble deciding means for determining an abnormal torque signal as estimated by said any one of input torque estimating means; and
   second oil pressure determining means for determining said oil pressure on the basis of the input torque to said automatic transmission, as estimated by another input torque estimating means, if said trouble deciding means decides a trouble about the input torque value estimated by said any one of input torque estimating means.

2. An automatic transmission control system according to claim 1,
   wherein said first oil pressure determining means includes means for determining said oil pressure on the basis of a sensed intake air flow of an engine connected to said automatic transmission, and
   wherein said second oil pressure determining means includes means for determining said oil pressure on the basis of a sensed throttle opening of said engine.

3. An automatic transmission control system according to claim 1,
   wherein said first oil pressure determining means includes means for determining said oil pressure on the basis of a sensed intake air flow of an engine connected to said automatic transmission, and
   wherein said second oil pressure determining means includes means for determining said oil pressure on the basis of both a capacity coefficient of a torque converter connecting said automatic transmission to an engine and a sensed engine RPM.

4. An automatic transmission control system according to claim 1,
   wherein said trouble deciding means includes means for deciding a trouble about data used to estimate said input torque.

5. An automatic transmission control system according to claim 1,
   wherein said trouble deciding means includes means for deciding a trouble with a mechanism for detecting data to estimate said input torque.

6. An automatic transmission control system according to claim 1,
   wherein said trouble deciding means includes means for deciding a trouble with a circuit for transmitting data to estimate said input torque.

7. An automatic transmission control system according to claim 1,
   wherein said trouble deciding means includes means for deciding a trouble with an air flow meter of an engine connected to said automatic transmission.

8. An automatic transmission control system according to claim 1, further comprising:
   an electronic control unit for said automatic transmission; and
   an electronic control unit for an engine connected to said automatic transmission,
   wherein said trouble deciding means includes means for deciding a trouble with a communication circuit between said electronic control units.

9. An automatic transmission control system according to claim 1,
   wherein said trouble deciding means includes means for deciding a trouble about the data of an intake air flow sensor of an engine connected to said automatic transmission.

10. An automatic transmission control system according to claim 1, further comprising an accessory, said accessory comprising an air conditioner,
    wherein said trouble deciding means includes means for deciding a trouble about an operation detection signal of said accessory.

11. An automatic transmission control system according to claim 1,
    wherein said trouble deciding means includes means for deciding a trouble with a mechanism for detecting a cooling water temperature of an engine connected to said automatic transmission.

12. An automatic transmission control system according to claim 1, further comprising shift deciding means for deciding that said automatic transmission is shifting, wherein when said shift deciding means decides the automatic transmission is shifting, said input torque estimating means estimates the input torque, and said first oil pressure determining means determines said oil pressure on the basis of the input torque.

13. An automatic transmission control system according to claim 1, wherein said trouble deciding means includes means for deciding a trouble on the basis of an absolute value of a change in a sensed intake air flow of an engine connected to said automatic transmission.

14. An automatic transmission control system according to claim 1, wherein said trouble deciding means includes means for deciding a trouble on the basis of a deviation between a sensed intake air flow of an engine connected to said automatic transmission and an air flow estimated from a sensed throttle opening.

15. An automatic transmission control system according to claim 1, wherein said trouble deciding means includes means for deciding a trouble on the basis of a time period for which a detection signal remains at a predetermined level.

16. An automatic transmission control system according to claim 1, wherein said oil pressure includes a back pressure of an accumulator connected to said frictional engagement device.

17. An automatic transmission control system according to claim 1, wherein said oil pressure includes a pilot pressure for regulating an application pressure of said frictional engagement device.

18. A control system for an automatic transmission, as connected to the engine, for controlling torque of the engine on the basis of a first control signal based on first torque estimating means and for controlling, if the first control signal is abnormal, the engine torque on the basis of a second control signal based on second torque estimating means, comprising:

hydraulic control means for controlling an oil pressure of a frictional engagement device of the automatic transmission on the basis of said first control signal and for controlling, if the torque of the engine is controlled on the basis of said second control signal, said oil pressure to a level corresponding to a torque no less than an input torque of the automatic transmission, as determined on the basis of said first control signal.

19. An automatic transmission control system according to claim 18, wherein said first control signal includes a signal based upon a sensed intake air flow of said engine, and wherein said second control signal includes a signal based upon a sensed throttle opening.

20. An automatic transmission control system according to claim 18, wherein said hydraulic control means includes means for controlling, if the torque of said engine is controlled on the basis of said first control signal, said oil pressure on the basis of a sensed intake air flow of said engine.

21. An automatic transmission control system according to claim 18, wherein said hydraulic control means includes means for controlling, if the torque of said engine is controlled on the basis of said second control signal, said oil pressure on the basis of a sensed throttle opening.

22. An automatic transmission control system according to claim 18, wherein said hydraulic control means includes means for controlling, if the torque of said engine is controlled on the basis of the second control signal, said oil pressure on the basis of both a capacity coefficient of a torque converter connecting said automatic transmission to said engine and a sensed engine RPM.

23. A control system for an automatic transmission connected to an engine which engine drives an accessory, and for controlling oil pressure of a frictional engagement device in accordance with an input torque to said automatic transmission, comprising:

trouble deciding means for deciding a trouble in a detected value of said accessory;

first input torque estimating means for estimating, if said trouble deciding means does not decide the trouble about the detected value, said input torque on the basis of a torque control signal of said engine; and second torque input estimating means for estimating, if said trouble deciding means decides the trouble about the detected value, said input torque to a level higher than the input torque estimated by said first input torque estimating means.

24. An automatic transmission control system according to claim 23, wherein said first input torque estimating means includes means for estimating said input torque on the basis of a sensed intake air flow of said engine.

25. An automatic transmission control system according to claim 23, wherein said second input torque estimating means includes means for estimating said input torque on the basis of a sensed throttle opening.

26. An automatic transmission control system according to claim 23, wherein said second input torque estimating means includes means for estimating said input torque on the basis of both a capacity coefficient of a torque converter connecting said automatic transmission to said engine and a sensed engine RPM.

* * * * *